UNITED STATES PATENT OFFICE.

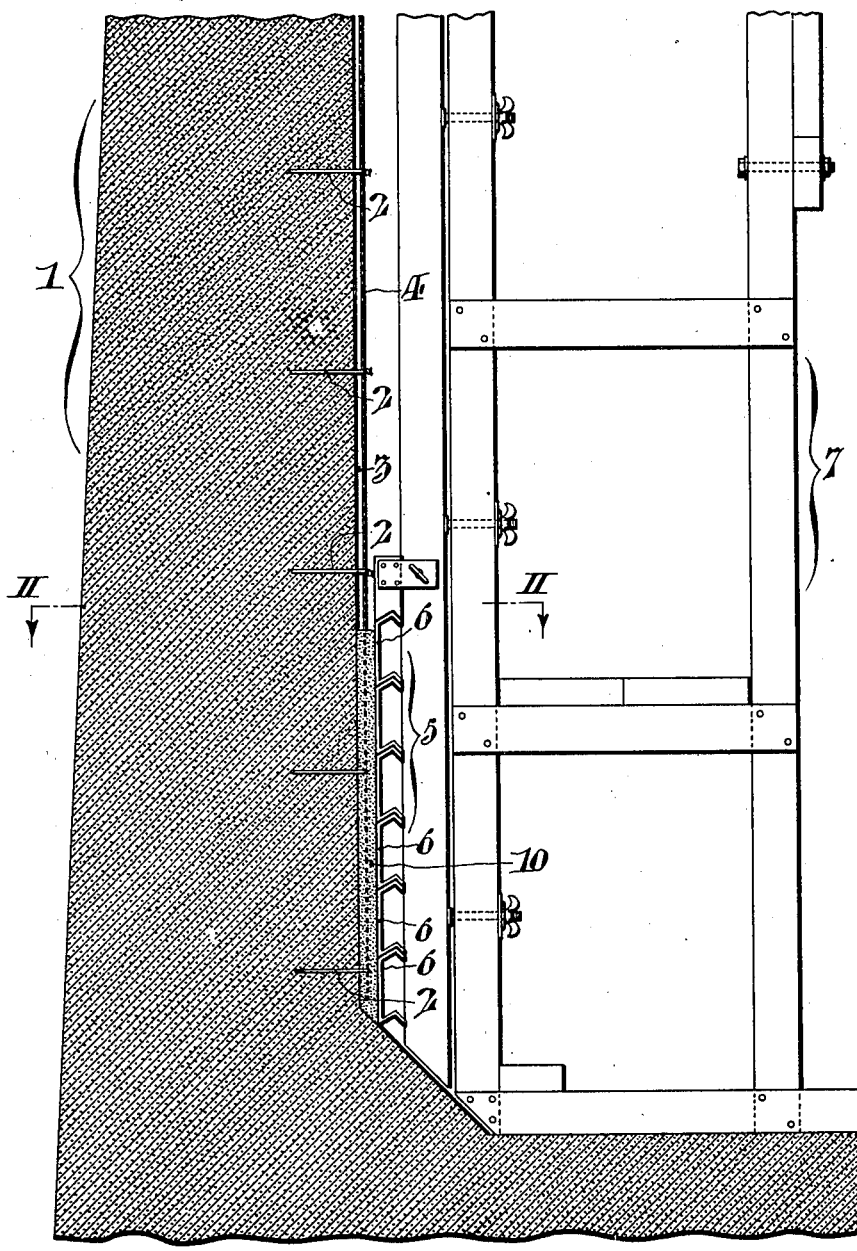

HENRY WIEDERHOLD, OF PHILADELPHIA, PENNSYLVANIA, ASSIGNOR TO THE BARBER ASPHALT PAVING COMPANY, OF PHILADELPHIA, PENNSYLVANIA, A CORPORATION OF WEST VIRGINIA.

BITUMINOUS WATERPROOF LINING FOR CONCRETE WALLS.

1,261,662.  Specification of Letters Patent.  Patented Apr. 2, 1918.

Application filed January 2, 1915. Serial No. 205.

*To all whom it may concern:*

Be it known that I, HENRY WIEDERHOLD, of Philadelphia, in the county of Philadelphia and State of Pennsylvania, have invented certain new and useful Improvements in Bituminous Waterproof Linings for Concrete Walls, whereof the following is a specification, reference being had to the accompanying drawings.

My invention relates to a bituminous waterproof lining capable of being applied and maintained upon a vertical or inclined concrete wall. The application of such a lining to concrete walls is useful, as for example where receptacles, such as reservoirs or tanks made of cement or concrete, are to be used to hold liquids which are corrosive in their nature, such as the acid liquids frequently used in metallurgical or other chemical processes. The bituminous lining to which this invention relates consists in general of a mastic-like mixture of a bituminous cementing material with a suitable mineral aggregate. In order that the bituminous cementing material may possess the desired waterproofing qualities it should have a consistency or penetration such that any cracks forming in the lining will have a tendency and capacity to heal themselves. Such a bituminous mixture is quite fluid when hot but at atmospheric temperatures sets to form comparatively a hard bituminous substance suitable for lining surfaces as above described.

No particular difficulty is experienced in applying such a bituminous lining to a substantially horizontal surface of concrete; but with inclined or vertical surfaces or walls, great difficulty has been experienced, because the material as it cools passes too quickly from the liquid to the solid state to permit of its being readily applied with a trowel as are ordinary mortars or other plastics. Efforts have been made to use burlap or similar fabrics to assist in the application of the bituminous lining but such efforts have not been very successful.

According to my invention I employ an expanded metal lath, or similar material and attach the same to the surface of the concrete wall by means of attaching cleats which are embedded in the concrete after it is originally placed and before it is set. After the metal lath has been thus attached to the concrete I erect a temporary limiting surface parallel to the concrete wall and at a distance from it corresponding to the thickness of the bituminous lining which it is proposed to apply. I then pour the bituminous substance while hot and fluid into the space thus afforded between the concrete and the limiting surface. The bituminous substance when cooled sets firmly around the metal lath attached to the concrete and thus the bituminous lining is firmly and effectually tied to the concrete wall which it lines, and the tendency of the bituminous material to slowly flow or sag away from the concrete wall which it lines is resisted or prevented.

In the accompanying drawings, Figure I, represents in vertical section the means employed in practising my invention.

Fig. II, is a partial horizontal section along the line II, II, of Fig. I.

The upright concrete wall 1, has wire cleats 2, set in it at proper intervals. This is preferably accomplished by embedding the cleats before the concrete has set. To the free ends of these wire cleats is attached a sheet of expanded metal lath 4, or some such similar supporting lathing, properly spaced from the wall as by interposition of the angle irons 3. A temporary limiting surface 5, is built up preferably by the superposition of suitable metal plates or strips 6, supported by a temporary scaffolding 7, the details of which need not be here described.

The limiting surface may, if desired, be built up initially to the entire height of the proposed bituminous lining, or preferably it may be built up successively strip by strip and the lining applied by successive pourings in the space provided by the erection of each strip. Having been built up to the desired height the bituminous substance is poured while hot and liquid into the space between the concrete wall and the limiting surface flowing around and through the metal lath and its supporting means, and forming the bituminous layer 10.

The space between the concrete and the limiting surface must be closed at the bottom and ends which is ordinarily accomplished by extending said surface to the bottom and sides of the receptacle to be lined.

When the bituminous lining after being poured hot has cooled and set the limiting surface and its supporting means are removed and the lining remains firmly attached to the concrete.

The cleats or staples embedded in the concrete surface afford the means for the attachment of the expanded metal lath or similar structure, and thus tie the entire bituminous surface to the concrete wall, for it will be understood that a bituminous mastic or similar bituminous waterproofing substance which is applied while liquid, to a concrete wall and suffered to set thereon, has a tendency especially in warm weather to flow and therefore is liable to become detached and displaced unless secured thereto by means such as I have described.

The structure and supporting means used for the limiting surface forms the subject matter of another application executed and filed by me simultaneously herewith, and for which has been issued Letters Patent No. 1,228,353, granted to me under date of May 29, 1917.

Having thus described my invention, I claim:

The combination of a concrete wall; metal lathing extending over the entire surface of the wall; means for spacing the lathing from the wall and for securing the lathing to the wall; and a bituminous waterproofing lining molded about the lathing and against the wall, whereby said lathing is completely covered and the surface of the wall imperviously lined by a permanently sustained bituminous lining.

In testimony whereof, I have hereunto signed my name, at Philadelphia, Pennsylvania, this thirtieth day of December, 1914.

HENRY WIEDERHOLD.

Witnesses:
 JAMES H. BELL,
 E. L. FULLERTON.